(12) United States Patent
Pham et al.

(10) Patent No.: US 10,009,195 B2
(45) Date of Patent: Jun. 26, 2018

(54) NONLINEAR EQUALIZER

(71) Applicant: Finisar Corporation, Sunnyvale, CA (US)

(72) Inventors: Thang Pham, Sunnyvale, CA (US); Chengpin Yu, Mountain View, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days. days.

(21) Appl. No.: 15/625,084

(22) Filed: Jun. 16, 2017

(65) Prior Publication Data

US 2017/0366375 A1  Dec. 21, 2017

Related U.S. Application Data

(60) Provisional application No. 62/350,860, filed on Jun. 16, 2016.

(51) Int. Cl.
| | |
|---|---|
| *H04L 25/03* | (2006.01) |
| *H04B 10/516* | (2013.01) |
| *H04B 10/58* | (2013.01) |
| *H04B 10/40* | (2013.01) |

(52) U.S. Cl.
CPC ... *H04L 25/03063* (2013.01); *H04B 10/5161* (2013.01); *H04B 10/58* (2013.01); *H04B 10/40* (2013.01)

(58) Field of Classification Search
CPC ......... H04L 25/03006; H04L 25/03044; H04L 25/03057; H04L 25/03063
USPC ....................................... 375/229, 232, 233
See application file for complete search history.

(56) References Cited

U.S. PATENT DOCUMENTS

2005/0030872 A1\* 2/2005 Yu .................... G11B 20/10009
369/59.22
2011/0069749 A1\* 3/2011 Forrester ........... H04L 25/03038
375/232

\* cited by examiner

*Primary Examiner* — Kevin Kim
(74) *Attorney, Agent, or Firm* — Maschoff Brennan (57) ABSTRACT

An equalizer and method is implemented to improve the performance of a communication system based on multi-level amplitude modulation schemes. The equalizer may include a linear equalization circuit including a plurality of time delayed taps and configured to receive an input signal and generate an output signal. The equalizer may further include a nonlinear circuit configured to receive signals from at least a portion of the time delayed taps and generate at least a portion of a difference between the signals, the output signal based at least in part on the difference.

20 Claims, 6 Drawing Sheets

NONLINEAR EQUALIZER

CROSS-REFERENCE TO RELATED APPLICATION

A claim for benefit of priority to the Jun. 16, 2016 filing date of the U.S. Patent Provisional Application No. 62/350,860, titled "NONLINEAR EQUALIZER" (the '860 Provisional Application), is hereby made pursuant to 35 U.S.C. § 119(e). The entire disclosure of the '860 Provisional Application is hereby incorporated herein.

FIELD

The embodiments discussed in the present disclosure are related to signal equalization, and more specifically to equalizers such as feed forward equalizers and decision feedback equalizers.

BACKGROUND

Communication systems are designed to transfer information between two or more devices over a transmission medium in the presence of interference or transmission influences. Intersymbol interference (ISI) is one well-known information-compromising influence in which transmitted symbols become elongated and interfere with adjacently transmitted symbols. This spreading or "smearing" of symbols is generally caused by bandwidth limitation and interference associated with all communication components and mediums and/or multipath propagation within those mediums. Because ISI has the same effect as noise, signal integrity may be compromised or made less reliable.

Furthermore in an optical transmission system, transmission components such as direct modulated lasers (DML) have different rise and fall times. A DML performs nonlinear conversion of input current into output optical intensity. In a multilevel phase amplitude modulation (e.g., PAM4) application, this nonlinearity of DML can cause the three PAM4 inner eyes, as plotted in an "eye diagram," to misalign. Fiber transmission can further make the PAM4 signal distorted.

An adaptive filtering process, referred to as equalization, is often used to flatten the frequency response of a communication components and medium and mitigate the effects of ISI. One specific filtering architecture used to flatten the frequency response is a Decision Feedback Equalizer (DFE) which may contain both a forward filter and a feedback filter. The performance of the DFE is generally limited by non-idealities such as frequency response, noise, nonlinearity, and mismatch associated with its data path and the data it operates on.

A receiver with a single sampling phase and a linear equalizer cannot compensate for such nonlinearity. As a result, the link performance exhibits a high bit-error rate. What is needed is a method and system to compensate for such nonlinearity of a DML and other components to improve the receiver sensitivity as well as an error floor of a system such as a PAM4 system.

SUMMARY

According to an aspect of an embodiment, a nonlinear equalizer may include a linear equalizer including a plurality of time delayed taps configured to receive an input signal and generate an output signal. The nonlinear equalizer may further include a nonlinear circuit configured to receive signals from at least a portion of the time delayed taps and generate at least a portion of a difference between the signals, the output signal based at least in part on the difference.

Further according to another aspect of an embodiment, a method includes linearly equalizing a plurality of time delayed taps including receiving an input signal and generating an output signal. The method may further include nonlinearly equalizing signals from at least a portion of the time delayed taps and generating at least a portion of a difference between the signals, the output signal based at least in part on the difference.

The objects and advantages of the embodiments will be realized and achieved at least by the elements, features, and combinations particularly pointed out in the claims.

It is to be understood that both the foregoing general description and the following detailed description are given as examples, are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

According to some embodiments described in the present disclosure, a data transmission system may include a transmitter, a receiver, and a data channel coupled between the receiver and the transmitter. The receiver may include an equalizer such as a Decision Feedback Equalizer (DFE) circuit. The equalizer may be configured to receive a signal from the data channel. In some embodiments, the equalizer may be configured to compensate for inter-symbol interference (ISI) that is caused by, for example a DML having different rise and fall times. This nonlinearity of the DML may cause, for example, the three PAM4 inner eyes, as plotted in an "eye diagram," to misalign.

The equalizer may be configured to compensate for such nonlinearity of the DML to improve the receiver sensitivity as well as an error floor of, for example, a PAM4 system. In one embodiment of the equalizer, the equalizer includes a linear equalizer including a plurality of time delayed taps configured to receive an input signal and generate an output signal. The equalizer may further include a nonlinear circuit configured to receive signals from at least a portion of the time delayed taps and generate at least a portion of a difference between the signals, the output signal based at least in part on the difference.

Embodiments of the present disclosure are now explained with reference to the accompanying drawings.

Figure 1:
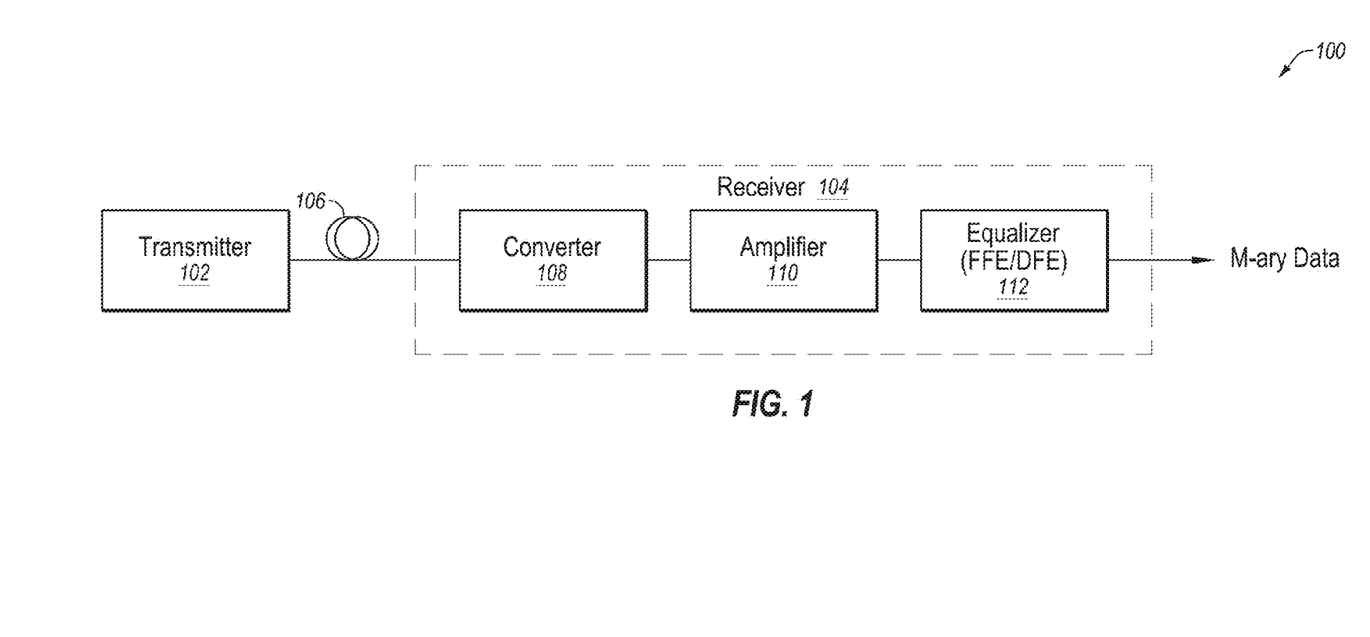
FIG. 1 illustrates a transceiver including a transmitter and a receiver.

FIG. 1 illustrates a transceiver 100 including a transmitter 102 and a receiver 104. The transmitter 102 may generate a modulated signal (e.g. an optical signal). The modulated signal may be transmitted via a transmission line 106 to the receiver 104. In one example, the transmission line 106 may be implemented as an optical fiber. In one example, the transmission line 106 be implemented in different lengths. The receiver 104 may generate binary or 4-ary output data. The transceiver 100 may utilize a Decision Feedback Equalizer (DFE) 112 in the receiver 104, as further disclosed herein.

Receiver 104 includes a converter stage 108, an amplifier stage (TIA) 110, and an equalizer stage (DFE) 112. The converter stage 108 may receive a modulated signal (e.g., an optical signal). For example, the converter stage 108 can receive a modulated signal (e.g., an optical signal) from a transmitter 102. In one example, the converter stage 108 can receive six samples of a signal, as represented by an eye diagram, from the transmitter 102.

The converter stage 108 may be implemented as an optical-electrical (OE) converter. The converter stage 108 may convert the modulated optical signal into an electrical signal.

The amplifier stage 110 may be configured as a transimpedance amplifier (TIA). The amplifier stage 110 may include a TIA that converts the electrical current signal into an electrical voltage signal. Additionally, the amplifier stage 110 may provide gain control for the electrical current signal. The amplifier stage 110 may be electrically coupled to the equalizer stage 112 or may couple to in intermediate equalizer (not shown), such as a continuous time linear equalizer (CTLE). An intermediate equalizer stage may be implemented as a linear front-end equalizer to increase height of an "eye opening of the electrical signal (e.g., the electrical voltage signal) as represented by an eye pattern (e.g., a 2D eye diagram).

The equalizer stage 112 may be configured to equalize the electrical signal (e.g., the electrical voltage signal) received from the amplifier 110 or an intermediate equalizer stage (not shown). The equalizer stage 112 may be implemented as a DFE and may include a Finite Impulse Response (FIR) filter and/or an Infinite Impulse Response (IIR) filter to provide electrical equalization. The equalizer stage 112 may be configured as a digital filter. The equalizer stage 112 may receive the electrical signal (e.g., the electrical voltage signal). The equalizer stage 112 may be configured to receive a multilevel (e.g., 4-ary) electrical signal (e.g., a PAM-4 signal) from the amplifier stage 110 or an intermediate equalizer stage (not shown), and generate a multilevel (e.g., 4-ary) signal.

The equalizer stage 112 may be configured to increase the width of an "eye opening" of the electrical signal (e.g., the electrical voltage signal) as represented by an eye pattern (e.g., a 2D eye diagram). The equalizer stage 112 may be configured to quantize the electrical signal (e.g., the electrical voltage signal) received from the amplifier stage 110 or an intermediate equalizer stage (not shown). Additionally, the equalizer stage 112 may be configured to add delay and/or alter waveform characteristics of the electrical signal (e.g., the electrical voltage signal) to eliminate noise-gain from the electrical signal (e.g., the electrical voltage signal) and to improve bandwidth of the modulated signal.

Furthermore, the transmitter 102 may include a precoder, a Feed Forward Equalizer (FFE) and an electrical-optical converter (all not shown). The receiver 104 may include the optical-electrical converter in the converter stage 108, the amplifier stage 110, and the equalizer stage (DFE) 112.

Figure 2:
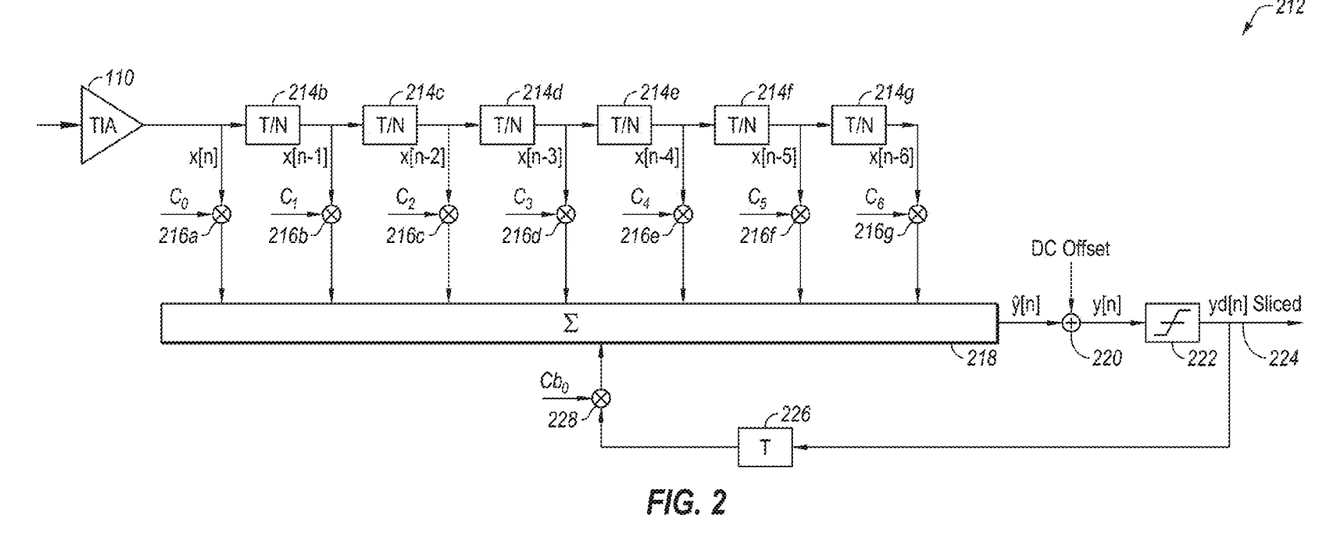
FIG. 2 is a block diagram of an equalizer, in accordance with an embodiment.

FIG. 2 is a block diagram of an equalizer 212, which is an embodiment of the equalizer 112 in FIG. 1. In this embodiment, equalizer 212 is implemented with an FIR filter having M-taps where, for example, M=7 in FIG. 2. Each tap corresponds to a data sample for a particular sample period. One of the 7-taps may designated as a "cursor" tap, which is the tap corresponding to a data sample designated as corresponding to the current sample period. The data sample for the cursor tap is referred to as the cursor sample. The other taps may correspond to data sample arriving after (or later than) the cursor sample and yet other taps may correspond to data sample arriving before (or prior to) the cursor sample.

As shown in FIG. 2, the data samples, x[n], are provided to a number of (M−1) delay elements, illustrated as six delay elements, 214b through 214g. Each delay element provides, for example, a one sample period (T) of delay. Alternatively, each delay element 214, as illustrated, may provide a fractional delay period of T/N. An example of N=2 provides the fractional delay period is T/2. The input data sample, x[n], and the outputs from delay elements 214b through 214g collectively represent the data samples for the 7-taps.

For each sample period, the data samples for the M taps are provided to multipliers 216a through 216g. Each multiplier 216 receives a respective data sample, which is denoted as x[n−i], and further receives a respective filter coefficient $C_i$, where i represents the tap index, for example, i equals 0 to 6 for the 7-tap example. Each multiplier 216 multiplies the received data sample x[n−i] with the received coefficient $C_i$ to provide a corresponding scaled sample. The $C_f$ scaled samples from multipliers 216a through 216g are then summed by adders, collectively illustrated as summer 218 to provide a filtered symbol, ŷ[n], for that symbol period.

The equalizer 212 may further include an adder 220. The filtered symbol, ŷ[n], may be added with a DC offset to generate the DC offset filtered symbol, y[n]. The equalizer 212 may further include a slicer 222 for making a decision of a signal level. The slicer 222 determines whether each equalized data received from the summer 218, as added by the dc offset, is above or below a threshold. By way of example, if PAM4 signal is normalized to respected to 4 levels 3, 1, −1, −3 then 2, 0, −2 may be used as the threshold by slicer 222 to determine whether a received sample is either a logical 3 or 2 or 1 or 0 value. For example, any received sample that has a normalized voltage above 2 will be determined to be a logic 3 value by slicer 222 and any received sample that has voltage below 2 but above 1 will be determined to by a logic 2 value by slicer 222. The slicer 222 then outputs the respective logical value of binary 3, 2, 1 or 0.

The equalizer 212 may further include a feedback delay element 226 configured to receive the sliced output signal 224 and generate a delayed sliced output signal. A multiplier 228 multiples the delayed sliced output signal with a constant $Cb_0$ with the product input to the summer 218.

Figure 3:
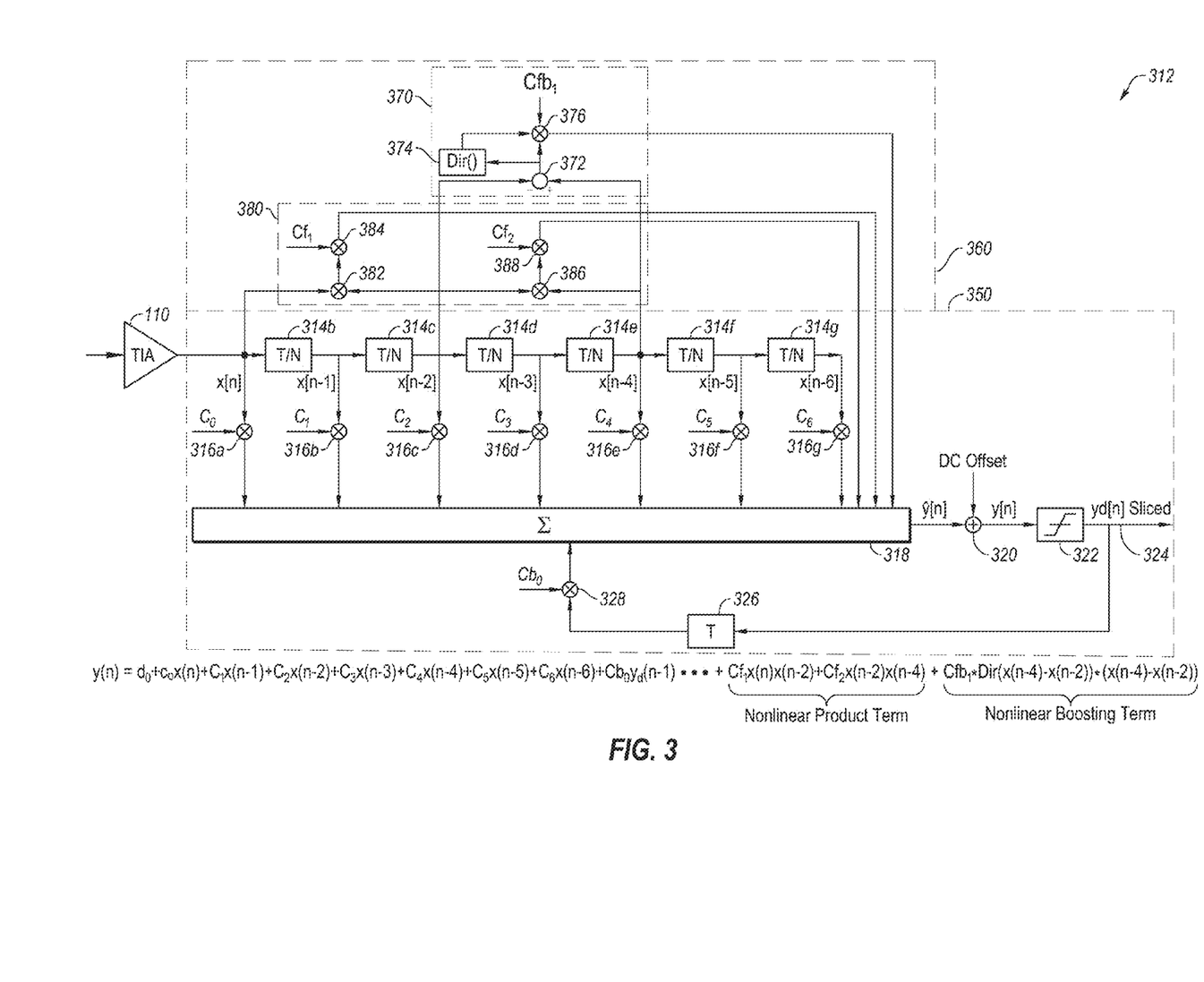
FIG. 3 is a block diagram of a nonlinear equalizer, in accordance with an embodiment.

FIG. 3 is a block diagram of a nonlinear equalizer 312, which is an embodiment of the equalizer 112 in FIG. 1. As stated, a communication signal is normally transmitted through a band-limited channel resulting in ISI. ISI is generally mitigated by equalization through linear filtering that affects serial data transmission. Further, the nonlinear behavior between the rise and fall times of the DML during switching, results in a nonlinear conversion of input current into output optical intensity.

In a PAM-4 modulation scheme, the nonlinearity of the DML may cause the three PAM-4 inner eyes, represented by an eye pattern (e.g., a 2D eye diagram), to misalign. Further, fiber dispersion in the transmission line may differently change the rise and fall times resulting in further asymmetry of the eye pattern. A receiver with a single sampling phase and linear equalizer may not compensate for the introduced nonlinearities, resulting in poor sensitivity and high bit error rate (BER).

As stated, FIG. 3 is a block diagram of a nonlinear equalizer 312, in accordance with an exemplary embodiment, and nonlinear equalizer 312 may be an embodiment of equalizer 112 in FIG. 1. Equalizer 312 includes a linear equalization circuit 350 and nonlinear circuit 360. The linear equalization circuit 350 may generally correspond to the equalizer 212 of FIG. 2. Specifically, the data samples, x[n], are provided to a number of (M−1) delay elements, illustrated by way of example only as six delay elements, 314b through 314g. Each delay element provides, for example, a one sample period (T) of delay. Alternatively, each delay element 314, as illustrated, may provide a fractional delay period of T/N and, in one example, N=2 may result in a fractional delay period of T/2. The input data sample, x[n], and the outputs from delay elements 314b through 314g collectively represent the data samples for the 7-taps.

For each sample period, the data samples for the M taps are provided to multipliers 316a through 316g. Each multiplier 316 receives a respective data sample, which is denoted as x[n−i], and further receives a respective filter coefficient $C_i$ where i represents the tap index, for example, i equals 0 to 6 for the 7-tap example. Each multiplier 316 multiplies the received data sample x[n−i] with the received coefficient $C_i$, to provide a corresponding scaled sample. The $C_f$ scaled samples from multipliers 316a through 316g are then summed by adders, collectively illustrated as summer 318 to provide a filtered symbol, ŷ[n], for that symbol period.

The equalizer 312 may further include an adder 320. The filtered symbol, ŷ[n], may be added with a DC offset to generate the DC offset filtered symbol, ŷ[n]. The equalizer 312 may further include a slicer 322 for making a decision of a signal level. The slicer 322 determines whether each equalized data received from the summer 318, as added by the dc offset, is above or below a threshold. By way of example, if PAM4 signal is normalized to respected to 4 levels 3, 1, −1, −3 then 2, 0, −2 may be used as the threshold by slicer 322 to determine whether a received sample is either a logical 3 or 2 or 1 or 0 value. For example, any received sample that has a normalized voltage above 2 will be determined to be a logic 3 value by slicer 322 and any received sample that has voltage below 2 but above 1 will be determined to by a logic 2 value by slicer 222. The slicer 322 then outputs the respective logical value of binary 3, 2, 1 or 0.

The equalizer 312 may further include feedback delay elements 326 configured to receive the sliced output signal 324 and generate a delayed sliced output signal. A multiplier 328 multiples the delayed sliced output signal with a constant $Cb_0$ with the product input to the summer 318. It is noted that an equalizer may include multiple feedback elements rather than just the single tap illustrated with respect to FIGS. 2 and 3.

Nonlinear equalizer 312 further includes a nonlinear circuit 360 which couples to the linear equalization circuit 350. Nonlinear circuit 360 may also be known as a "boosting equalizer" because the nonlinear circuit 360 adds a portion of the difference between tap values to the sum of the equalizer before the slicer. Further, the nonlinear circuit includes directionality, that is to say, the nonlinear circuit 360 may be configured to "boost" the output signal of summer 318 or "antiboost" the output signal of summer 318 when there is a transition from either high level to low level or low level to high level.

Furthermore, the nonlinear circuit 360 may include a nonlinear boosting circuit 370 and a nonlinear product circuit 380. Nonlinear boosting circuit 370 may include one or more comparators which includes inputs from outputs of any two delay elements. In this example, a comparator 372 which includes inputs from outputs of both the delay element 314c and 314e. Comparator 372 outputs a signal to a direction function 374 which generates an output equaling zero when the comparator 372 outputs a positive result and direction function 374 generates an output equaling one when the comparator 372 outputs a negative result. The output of the direction function 374, the output of the comparator 372, and a constant $Cfb_1$ are input to a multiplier 376 which generates an output $Cfb1*Dir(x(n−4)−x(n−2))*(x(n−4)−x(n−2))$. The output is input into summer 318 to provide nonlinear boosting equalization.

Furthermore, the nonlinear product circuit 380 may be configured according to a Volterra model. Nonlinear product circuit may include multiple multiplier which multiply the signals from delay elements to generate an output that is multiplied with a coefficient. Output from all multiplier are input to the summer to provide further nonlinear equalization. In the example, nonlinear product circuit 380 is configured based on a simple second order Volterra model. Nonlinear product circuit 380 may include first multiplier 382 which multiples the signals x[n] and x[n−2] to generate an output that is multiplied with a constant $Cf_1$ at a multiplier 384. Similarly, nonlinear product circuit 380 may include second multiplier 386 which multiples the signals x[n−2] and x[n−4] to generate an output that is multiplied with a constant $Cf_2$ at a multiplier 388. Both outputs from multipliers 384 and 388 are input into summer 318 to provide further nonlinear equalization.

In the example, nonlinear equalizer 312 includes linear equalization circuit 350 and nonlinear circuit 360 results in a transfer function as shown in the following equation:

$$y(n) = d_0 + C_0 x(n) + C_1 x(n-1) + C_2 x(n-2) + C_3 x(n-3) + C_4 x(n-4) + C_5 x(n-5) + C_6 x(n-6) + Cb_0 y_d(n-1) \ldots \ldots$$
$$+ Cf_1 x(n) x(n-2) + Cf_2 x(n-2) x(n-4) + Cfb_1 * Dir(x(n-4) - x(n-2)) * (x(n-4) - x(n-2)).$$

Figure 4:
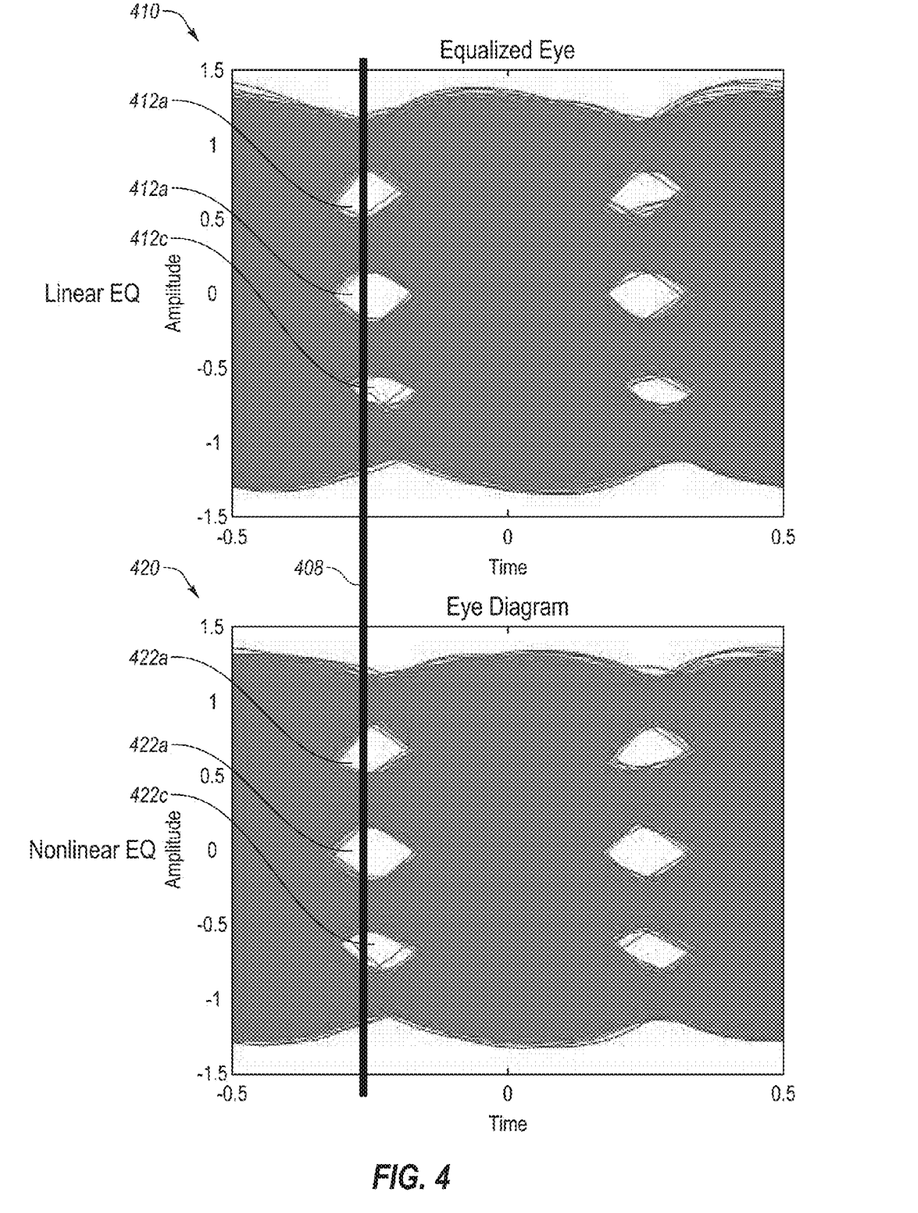
FIG. 4 illustrates eye diagrams for linear equalization and nonlinear equalization, in accordance with exemplary embodiments.

FIG. 4 illustrates eye diagrams for linear equalization and nonlinear equalization, in accordance with exemplary embodiments. An eye diagram 410 illustrates an electrical output signal of the equalizer when only linear equalization is used. The transfer function is illustrate by the three PAM4 inner eyes 412. The various PAM4 inner eyes are misaligned. Specifically and by way of example, inner eye 412c, at the time designated by a cursor 408, is both more closed and shifted ahead in time from inner eyes 412a and 412b.

An eye diagram 420 illustrates an output signal of the equalizer when both linear equalization and an additional nonlinear equalization are used. The various PAM4 inner eyes are aligned in time by an improved margin. Specifically and by way of example, inner eye 422c, at a time designated by a cursor 408, is both more open and shifted back in time from inner eyes 422a and 422b. Accordingly, slicing at the time designated by the cursor 408 as illustrated in the nonlinear equalization eye diagram 420 results in an improved receiver sensitivity and bit error rate (BER) over a system that merely employs linear equalization alone.

The eye diagram 420 results from the nonlinear equalizer 312 being configured with the nonlinear boosting circuit 370 of nonlinear circuit 360 and linear equalization circuit 350.

As stated, the nonlinear product circuit 380 may be optional and provide further improvements.

Figure 5:
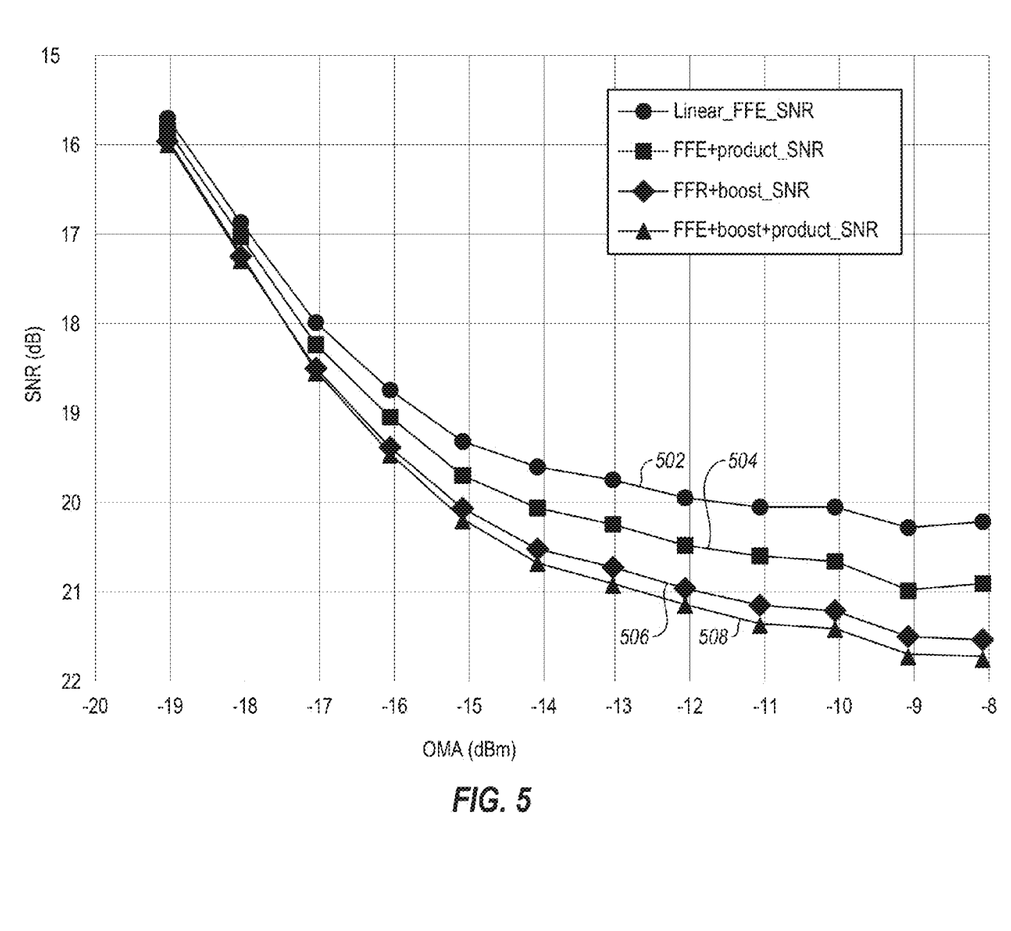
FIG. 5 is a plot of a simulation of the signal-to-noise ratio (SNR) of variations of the nonlinear equalizer of FIG. 3, in accordance with an exemplary embodiment.

FIG. 5 is a plot of a simulation of the SNR of variations of the nonlinear equalizer of FIG. 3, in accordance with exemplary embodiments. The various curves represent different configurations of the various blocks of the nonlinear equalizer 312 of FIG. 3. Further, simulation of the BER illustrates similar improvements.

Specifically, a trace 502 illustrates the SNR for a signal processed with only the linear equalization circuit 350 of the nonlinear equalizer 312 of FIG. 3. Additionally, a trace 504 illustrates the SNR for a signal processed with the linear equalization circuit 350 and the nonlinear product circuit 380 of the nonlinear equalizer 312 of FIG. 3. Further, a trace 506 illustrates the SNR for a signal processed with the linear equalization circuit 350 and the nonlinear boosting circuit 370 of the nonlinear equalizer 312 of FIG. 3. Lastly, a trace 508 illustrates the SNR for a signal processed by the linear equalization circuit 350 and both the nonlinear boosting circuit 370 and the nonlinear product circuit 380. It is noted that the SNR becomes improved with each additional function performed on a signal by blocks within the nonlinear circuit 360. Improvements to BER exhibit similar improvements as noted in the SNR improvements illustrated in the plot of FIG. 5.

Figure 6:
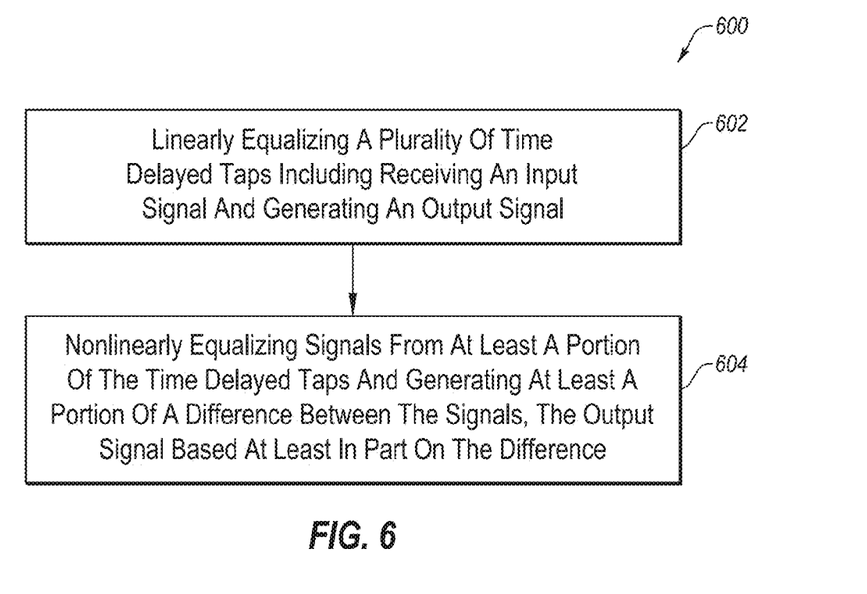
FIG. 6 is a flowchart of an example method of nonlinear signal equalization.

FIG. 6 is a flowchart of an example method 600 of nonlinear signal equalization, arranged in accordance with at least one embodiment. The method 600 may be implemented, in some embodiments, by a nonlinear equalizer or a decision feedback equalizer, such as one or more of the decision feedback equalizers of FIGS. 1-5. Although illustrated as discrete circuits or blocks, various blocks may be divided into additional blocks, combined into fewer blocks, or eliminated, depending on the target implementation.

The method 600 may begin at block 602, where the method may be linearly equalizing a plurality of time delayed taps including receiving an input signal and generating an output signal.

At block 604, the method may be nonlinearly equalizing signals from at least a portion of the time delayed taps and generating at least a portion of a difference between the signals, the output signal based at least in part on the difference.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A nonlinear equalizer, comprising:
    a linear equalizer circuit including a plurality of time delayed taps and configured to receive an input signal and generate an output signal; and
    a nonlinear circuit configured to receive signals from at least a portion of the time delayed taps and generate at least a portion of a difference between the signals, the output signal based at least in part on the difference.

2. The nonlinear equalizer of claim 1, wherein the nonlinear circuit is configured to determine the difference and provide the difference to the linear equalizer for summing with each of the outputs of the plurality of time delayed taps.

3. The nonlinear equalizer of claim 2, further including a direction function configured to generate a constant based on a determination of the input signal transitioning between high and low levels.

4. The nonlinear equalizer of claim 1, wherein the nonlinear circuit is configured to form a product of the signals of the at least a portion of the time delayed taps, the product provided to the linear equalizer for summing with each of the outputs of the plurality of time delayed taps.

5. The nonlinear equalizer of claim 4, wherein the product is formed according to a Volterra model.

6. The nonlinear equalizer of claim 1, wherein the nonlinear circuit is configured to:
    determine the difference and provide the difference to the linear equalizer for summing with each of the outputs of the plurality of time delayed taps; and form a product of the signals of the at least a portion of the time delayed taps, the product provided to the linear equalizer for summing with each of the outputs of the plurality of time delayed taps.

7. The nonlinear equalizer of claim 1, wherein the delayed taps are fractionally spaced to a value less than or equal to one period.

8. The nonlinear equalizer of claim 1, wherein the plurality of time delayed taps includes seven time delayed taps.

9. A method, comprising:
   linearly equalizing a plurality of time delayed taps including receiving an input signal and generating an output signal; and
   nonlinearly equalizing signals from at least a portion of the time delayed taps and generating at least a portion of a difference between the signals, the output signal based at least in part on the difference.

10. The method of claim 9, wherein the nonlinearly equalizing including determining the difference and the linearly equalizing including summing the difference with each of the outputs of the plurality of time delayed taps.

11. The method of claim 10, further including generating a direction constant based on the input signal transitioning between high and low levels.

12. The method of claim 9, wherein the nonlinearly equalizing includes forming a product of the signals of the at least a portion of the time delayed taps, and the linearly equalizing includes summing the difference with each of the outputs of the plurality of time delayed taps.

13. The method of claim 12, wherein the product is formed according to a Volterra model.

14. The method of claim 9, wherein the nonlinearly equalizing includes:
   determining the difference for summing with each of the outputs of the plurality of time delayed taps; and
   forming a product of the signals of the at least a portion of the time delayed taps and providing, the product for summing with each of the outputs of the plurality of time delayed taps.

15. The method of claim 9, wherein the delayed taps are fractionally spaced to a value less than or equal to one period.

16. The method of claim 9, wherein the plurality of time delayed taps includes seven time delayed taps.

17. A nonlinear equalizer, comprising:
   means for linearly equalizing a plurality of time delayed taps including receiving an input signal and generating an output signal; and
   means for nonlinearly equalizing signals from at least a portion of the time delayed taps and generating at least a portion of a difference between the signals, the output signal based at least in part on the difference.

18. The nonlinear equalizer of claim 17, wherein the means for nonlinearly equalizing includes means for determining the difference and the means for linearly equalizing includes summing the difference with each of the outputs of the plurality of time delayed taps.

19. The nonlinear equalizer of claim 18, further including means for generating a direction constant based on the input signal transitioning between high and low levels.

20. The nonlinear equalizer of claim 17, wherein the means for nonlinearly equalizing includes means for forming a product of the signals of the at least a portion of the time delayed taps, and the means for linearly equalizing includes means for summing the difference with each of the outputs of the plurality of time delayed taps.

* * * * *